United States Patent [19]
Watanabe

[11] Patent Number: 5,287,429
[45] Date of Patent: Feb. 15, 1994

[54] HIGH SPEED RECOGNITION OF A STRING OF WORDS CONNECTED ACCORDING TO A REGULAR GRAMMAR BY DP MATCHING

[75] Inventor: Takao Watanabe, Tokyo, Japan
[73] Assignee: NEC Corporation, Tokyo, Japan
[21] Appl. No.: 800,080
[22] Filed: Nov. 29, 1991
[30] Foreign Application Priority Data
Nov. 28, 1990 [JP] Japan .................. 2-327061
[51] Int. Cl.⁵ .................................................. G10L 9/02
[52] U.S. Cl. ................................................. 395/2.48
[58] Field of Search ........................... 381/41–46; 395/2.48

[56] References Cited
U.S. PATENT DOCUMENTS

| | | | |
|---|---|---|---|
| 4,555,796 | 11/1985 | Sakoe | 381/43 |
| 4,624,008 | 11/1986 | Vensko et al. | 381/43 |
| 4,882,757 | 11/1989 | Fisher et al. | 381/43 |
| 5,073,939 | 12/1991 | Vensko et al. | 381/43 |

Primary Examiner—Michael R. Fleming
Assistant Examiner—Michelle Doerrler
Attorney, Agent, or Firm—Sughrue, Mion, Zinn, Macpeak & Seas

[57] ABSTRACT

On carrying out connected word recognition in compliance with a regular grammar and in synchronism with successive specification of input feature vectors of an input pattern, one of an n-th word (n) of first through third occurrence (n(1) to n(3)) is selected as the n-th word of selected occurrence in an i-th period in which an n-th input feature vector is specified. The n-th word appears as the first through the third occurrence in transition rules specified by the grammar. In the i-th period, distances are calculated, only for the n-th word of the selected occurrence, between the input feature vector assigned to the i-th period and reference feature vectors for the n-th word. In the i-th period, a recurrence value g(n, i, j) is calculated only for the n-th word of the selected occurrence under a boundary condition T(p, i−1) iteratively in correspondence to the reference feature vectors by using the distances calculated for the n-th word of the selected occurrence before the i-th period, where j represents each feature vector. The recurrence value for the n-th word of nonselected occurrence is estimated by using the recurrence value for the n-th word of the selected occurrence and the boundary conditions T(p, i−1)'s for the n-th word of the selected and the nonselected occurrence. The above-mentioned one of the n-th word of the first through the third occurrence is selected so as to have a minimum value of the T(p, i−1)'s.

1 Claim, 4 Drawing Sheets

```
T (p,0) = 0 (WHEN p IS AN INITIAL STATE)
            (WHEN p IS NOT AN INITIAL STATE)
FOR i = 1, I
  T (p,i) = ∞ (ALL OCCASIONS OF p)
  FOR n = 1, N
    g(n, i-1, 0) = T (pp(n), i-1)
    ℓ(n, i-1, 0) = i-1
    FOR j = 1, Jn
      m* = argmin  [g(n, i-1, j-m)]
           m=0,1
      g(n, i, j) = d (n, i, j) + g(n, i-1, j-m*)
      ℓ(n, i, j) = ℓ(n, i-1, j-m*)
    NEXT
    WHEN T(qq(n), i) > g(n, i, Jn)
      T(qq(n), i) = g(n, i, Jn)
      N(qq(n), i) = n
      P(qq(n), i) = pp(n)
      L(qq(n), i) = (n, i, Jn)
    END
  NEXT
NEXT
```

$T(p,0) = 0$ (WHEN p IS AN INITIAL STATE)
$T(p,i) = \infty$ (WHEN p IS NOT AN INITIAL STATE) (ALL OCCASIONS OF p)

```
FOR i = 1, I
  FOR n = 1, N
    K* = argmin  [T(pp(k,n), i-1)]
         k=1,Kn
    f(n, i-1) = T(pp(k*,n), i-1)                                    ⎫
    g(n, i-1, 0) = T(pp(k*,n), i-1)                                  ⎬ (a)
    ℓ(n, i-1, 0) = i-1                                              ⎭
    FOR j = i, Jn
      m* = argmin  [g(n, i-1, j-m)]                                  ⎫
           m=0,1                                                      ⎬ (b)
      g(n, i, j) = d(n, i, j) + g(n, i-1, j-m*)                      ⎬
      ℓ(n, i, j) = ℓ(n, i-1, j-m*)                                   ⎭
    NEXT
    FOR K = 1, Kn                                                    ⎫
      gK = g(n, i, Jn) - f(n, ℓ(n, i, Jn)) + T(pp(k,n), ℓ(n, i, Jn)) ⎪
      WHEN T(qq(k,n), i) > gK                                         ⎪
        T(qq(k,n), i) = gK                                            ⎬ (c)
        N(qq(k,n), i) = n                                             ⎪
        P(qq(k,n), i) = pp(k,n)                                       ⎪
        L(qq(k,n), i) = ℓ(n, i, Jn)                                   ⎪
      END                                                             ⎪
    NEXT                                                              ⎭
  NEXT
NEXT
```

FIG. 4

HIGH SPEED RECOGNITION OF A STRING OF WORDS CONNECTED ACCORDING TO A REGULAR GRAMMAR BY DP MATCHING

BACKGROUND OF THE INVENTION

This invention relates to a connected word recognition method of automatically recognizing, as an optimum one of word concatenations, an input string of words represented by an input sequence of input pattern feature vectors.

The input string of words is selected from a word set of first through N-th words and substantially continuously uttered in compliance with a regular grammar, or a grammar of regular languages, known in the art. Each concatenation is a string of words selected from the word set and conatenated in compliance with the grammar. The grammar specifies a set of transition rules for the first through the N-th words and a set of final states of the concatenations. The transition rule for an n-th word optionally selected from the word set, defines a combination of the n-th word and a state pair consisting of a start and an end state of the n-th word.

A connected word recognition system for use in carrying out the connected word recognition method, is disclosed in U.S. Pat. No. 4,555,796 issued to Hiroaki Sakoe. The connected word recognition system uses a DP (dynamic programming) matching algorithm based on frame synchronization known in the art. That is, the connected word recognition system operable according to a DP algorithm and in compliance with the regular grammar, is put into operation in synchronism with successive specification of the input pattern feature vectors of the input string in the following manner.

In the Sakoe patent, the connected word recognition system comprises a reference pattern memory for memorizing reference pattern feature vectors representative of the first through the N-th words. The reference pattern feature vectors representative of the n-th word are consecutively numbered as first through J-th feature vectors according to utterance of the n-th word.

A control circuit is for generating a basic timing signal successively specifying first through I-th periods assigned to the respective input pattern feature vectors, a word specifying signal specifying, while an i-th period is specified as each of the first through the I-th periods, the first through the N-th words, and a state specifying signal specifying, while the i-th period is specified, the state pairs of the first through the N-th words.

A distance calculating circuit is responsive to the input sequence and is connected to the reference pattern memory and the control circuit for calculating, while the n-th word is specified in the i-th period, a plurality of distances between the input pattern feature vector assigned to the i-th period and the first through the J-th feature vectors.

A minimum finding circuit is connected to the control circuit and the distance calculating circuit for calculating, while the n-th word and each state pair of the n-th word are specified in the i-th period, a recurrence value $g(n, i, j)$ for the n-th word and the each state pair under a boundary condition iteratively in correspondence to the first through the J-th feature vectors by using the distances calculated for the n-th word before the i-th period, where n represents the n-th word, i represents the i-th period, and j represents a j-th feature vector representative of each of the first through the J-th feature vectors.

The minimum finding circuit is for finding, while the i-th period is specified, a minimum $T(q, i)$ of the recurrence values calculated for the words having state pairs including the end state q of the each state pair.

The minimum finding circuit is for deciding that particular word and that particular start state of the particular word for which the minimum is found. The boundary condition is given by $T(p, i-1)$, where p represents the start state of the each state pair.

A start period selecting circuit is connected to the control circuit and the minimum finding circuit for selecting, while the i-th period is specified, a particular period from the first through the $(i-1)$-th periods with reference to the particular start state and the particular word.

A deciding circuit is connected to the control circuit, the minimum finding circuit, and the start period selecting circuit for deciding the optimum concatenation by referring, after lapse of the I-th period, to the minima found in the first through the I-th periods, respectively, and to those particular words, those particular start states, and those particular start periods which are decided in the first through the I-th periods.

Inasmuch as the connected word recognition system operates in synchronism with successive specification of the input pattern feature vectors of the input string, the connected word recognition system can carry out real-time processing of the input string. It will be assumed that the n-th word appears in a plural number K of the transition rules as the n-th word of first through K-th occurrence. In this case, the transition rules for the n-th word of the first through the K-th occurrence define different start states which are different from each other. It is therefore necessary to independently carry out processing for the n-th word of the first through the K-th occurrence. This results in an increased amount of calculation.

SUMMARY OF THE INVENTION

It is therefore an object of this invention to provide a connected word recognition method which is capable of providing a result of recognition with a reduced amount of calculation.

It is another object of this invention to provide a connected word recognition method of the type described, which is capable of providing the result of recognition at a high speed.

Other objects of this invention will become clear as the description proceeds.

On describing the gist of this invention, it is possible to understand that a method is for recognizing, as an optimum one of word concatenations, an input string of words represented by an input sequence of input pattern feature vectors, the input string of words being selected from a word set of first through N-th words and continuously uttered in compliance with a regular grammar, where N represents an integer greater than one, each concatenation being a string of words selected from the word set and concatenated in compliance with the grammar, the grammar specifying a set of transition rules of the first through the N-th words and a set of final states of the concatenations, an n-th word optionally selected from the first through the N-th words of the word set appearing in a plural number K of the transition rules as the n-th word of first through K-th occurrence, each of the n-th word of the first through the K-th occurrence defining a combination of the n-th word and a state pair consisting of a start and an end state of the n-th word, the method comprising the steps of:

memorizing reference pattern feature vectors representative of the first through the N-th words, the reference pattern feature vectors representative of the n-th word being feature vectors representative of the n-th word being consecutively numbered as first through J-th feature vectors according to utterance of the n-th word, where J represents still another integer greater than one;

generating a basic timing signal successively specifying first through I-th periods assigned to the respective input pattern feature vectors, a word specifying signal specifying, while an i-th period is specified as each of the first through the I-th periods, the first through the N-th words, and a state specifying signal specifying, while the i-th period is specified, the state pairs of the first through the N-th words, where I represents still another integer greater than one;

selecting in response to the input sequence and the base timing, the word specifying, and the state specifying signals, while the n-th word is specified in said i-th period, one of the n-th word of said first through said K-th occurrence as a selected n-th word;

calculating in response to the input sequence and the base timing, the word specifying, and the state specifying signals, while the n-th word is specified in the i-th period, a plurality of distances between the input pattern feature vector assigned to the i-th period and the first through the J-th feature vectors only for the selected n-th word;

calculating in response to the base timing, the word specifying, and the state specifying signals, while the n-th word and each state pair of the n-th word are specified in the i-th period, a recurrence value g(n, i, j) only for the selected n-th word and the state pair for the selected n-th word under a boundary condition iteratively in correspondence to the first through the J-th feature vectors by using the distance calculated for the selected n-th word before the i-th period, where n represents the n-th word, i represents the i-th period, and j represents a j-th feature vector representative of each of the first through the J-th feature vectors, the last-mentioned calculating step estimating the recurrence value for the selected n-th word by using the recurrence value for the selected n-th word and the boundary conditions for said selected and the nonselected n-th word, the nonselected n-th word being a remaining one of the n-th word of the first through the K-th occurrence that is not selected by the selecting step, the last-mentioned calculating step finding, while the i-th period is specified, a minimum T(q, i) of the recurrence values obtained for the words having state pairs including the end state q of the each state pair, the last-mentioned calculating step deciding that particular word and that particular start state of the particular word for which the minimum is found, the boundary conditions being given by T(p, 1), where p represents the start state of each state pair;

selecting in response to the basic timing, the word specifying, and the state specifying signals, while the i-th period is specified, a particular period from the first through the (i−1)-th periods with reference to the particular start state and the particular word; and deciding the optimum concatenation by referring, after lapse of the I-th period, to the minima found in the first through the I-th periods, respectively, and to those particular words, those particular start states, and those particular start periods which are decided in the first through the I-th periods;

the first-mentioned selecting step being for selecting, as the selected n-th word, the one of the n-th word of the first through the k-th occurrence that has a minimum value of the boundary conditions T(p, i−1)'s.

BRIEF DESCRIPTION OF THE DRAWING

FIG. 4 is a diagram for use in describing the connected word recognition method according to the embodiment of this invention.

DESCRIPTION OF THE PREFERRED EMBODIMENT

Figures 1, 2:
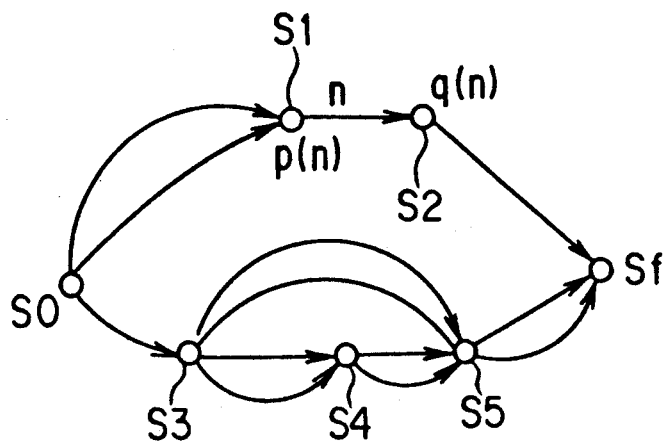
FIG. 1 is a state transition diagram of states for use in describing a conventional connected word recognition method.
FIG. 2 is a diagram for use in describing the conventional connected word recognition method.

Referring to FIGS. 1 and 2, a conventional connected word recognition method will be described at first for a better understanding of this invention. The conventional connected word recognition method is substantially equivalent to the connected word recognition method described in the preamble of the instant specification.

The connected word recognition method is for automatically recognizing an input string A of words as an optimum one of word concatenations. The input string A of words is represented by an input sequence of first through I-th input pattern feature vectors $a_1$ to $a_I$ as:

$$A = a_1, a_2, \ldots, a_I.$$

The input string A of words is selected from a word set of first through N-th words and substantially continuously uttered in compliance with a regular grammar. On selecting the words, repetition is allowed according to the grammar. It is possible to identify or designate the first through the N-th words by consecutive natural numbers. It will be assumed that the word set consists of the first through the N-th words 1 to N.

Each of the word concatenations is a string of words selected from the word set and concatenated in compliance with the grammar. The grammar specifies a set of transition rules for the first through the N-th words and a set of final states of the concatenations. The transition rule for an n-th word n optionally selected from the word set, defines a combination of the n-th word n and a state pair consisting start and end states of the n-th word n.

In FIG. 1, state transition is possible from an initial state S0 to a first possible state S1 through two different paths for different words selected from the word set. The first possible state S1 is succeeded by a second possible state S2 through a path for a word which is selected from the word set and which is exemplified in FIG. 1 at n. In the illustrated example, the transition rule for the word n defines a combination of the word n and a state pair consisting of start and end states p(n) and q(n) of the word n. For generality of denotation, the start and the end states will be denoted by p and q. The second possible state S2 is followed by a final possible state Sf through another path for another word. Likewise, the state transition is also possible from the initial state S0 to the final possible state Sf through third through fifth possible states S3, S4, and S5. The state transition is furthermore possible from the initial state S0 to the final possible state Sf through the third and the fifth states S3 and S5.

According to the connected word recognition method, reference pattern feature vectors representative of the first through the N-th words 1 to N are memorized in a reference pattern memory (not shown) as first through N-th reference patterns $B^1$ to $B^N$. An n-th reference pattern $B^n$ representative of the n-th word n, is given by first through J-th reference pattern feature vectors $b_1^n$ to $b_J^n$ as:

$$B^n = b_1^n, b_2^n, \ldots, b_J^n.$$

Depending on the circumstances, the affix "n" will be omitted. The first through the J-th reference pattern feature vectors $b_1$ to $b_J$ are successively arranged according to utterance of the n-th word n. Merely for brevity of description, the first through the J-th reference pattern feature vectors $b_1$ to $b_J$ are referred to as first through J-th feature vectors $b_1$ to $b_J$.

A basic timing signal is generated by a control circuit (not shown) to successively specify first through I-th periods assigned to the respective input pattern feature vectors $a_1$ to $a_I$. A word specifying signal is also generated by the control circuit to specify the first through the N-th words 1 to N while an i-th period is specified as each of the first through the I-th periods. A state specifying signal is furthermore generated by the control circuit to specify the state pairs of the first through the N-th words 1 to N while the i-th period is specified.

While the n-th word n is specified in the i-th period, a plurality of distances between the input pattern feature vector assigned to the i-th period and the first through the J-th feature vectors $b_1$ to $b_J$ are calculated by a distance calculating circuit (not shown).

While the n-th word n and each state pair of the n-th word n are specified in the i-th period, a recurrence value g(n, i, j) is calculated by a minimum finding circuit (not shown) for the n-th word n and the each state pair under a boundary condition iteratively in correspondence to the first through the J-th feature vectors by using the distances calculated for the n-th word n before the i-th period, where n represents the n-th word, i represents the i-th period, and j represents a j-th feature vector representative of each of the first through the J-th feature vectors.

The minimum finding circuit finds, while the i-th period is specified, a minimum T(q, i) of the recurrence values calculated for the words having state pairs including the end state q of the each state pair.

The minimum finding circuit decides that particular word and that particular start state of the particular word for which the minimum is found. The boundary condition is given by T(p, i−1), where p represents the start state of the each state pair.

While the i-th period is specified, a particular period is selected by a start period selecting circuit (not shown) from the first through the (i−1)-th periods with reference to the particular start state and the particular word.

The optimum concatenation is decided by a deciding circuit (not shown) by referring, after lapse of the I-th period, to the minima found in the first through the I-th periods, respectively, and to those particular words, those particular start states, and those particular start periods which are decided in the first through the I-th periods.

Inasmuch as operation is controlled in synchronism with successive specification of the input pattern feature vectors $a_1$ to $a_I$ of the input string A in the connected word recognition method, it is possible to carry out real-time processing of the input string A.

Processing of the input string A is carried out in the connected word recognition method in the manner illustrated in FIG. 2. In FIG. 2, j represents a time instant of a j-th reference pattern feature vector $b_j^n$ optionally selected from the first through the J-th reference pattern feature vectors $b_1^n$ to $b_J^n$. In addition, pp(n) represents a state number of the state p(n) immediately before appearance of the n-th word n and qq(n) represents another state number of the state q(n) immediately after appearance if the n-th word n. T(p, i) represents a minimum (or a minimum accumulated distance) when processing reaches the start state p at the i-th period. N(p, i) represents a word number of the word on an optimum path immediately before processing reaches the state p at the i-th period. L(p, i) represents a time instant of the start state of the word on an optimum path immediately before processing reaches the state p at the i-th period. Furthermore, g(n, i, j) represents a recurrence value for the word n at a time instant of the j-th reference pattern feature vector $b_j^n$ during the i-th period. In addition, d(n, i, j) represents a distance between the input feature vector assigned to the i-th period and the j-th reference pattern feature vector $b_j^n$ of the word n. Furthermore, l(n, i, j) represents a time instant of the start state of the word on an optimum path immediately before processing reaches the j-th reference pattern feature vector $b_j^n$ of the word n at the i-th interval. A symbol "arg min" represents selection of one of parameters m* that minimizes an argument enclosed with blacket pair.

Figure 3:
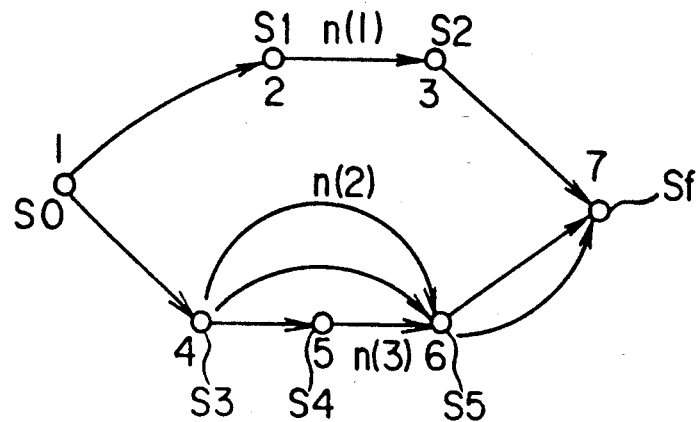
FIG. 3 is a state transition diagram of states for use in describing a connected word recognition method according to an embodiment of this invention.

Turning to FIGS. 3 and 4, description will proceed to a connected word recognition method according to an embodiment of this invention. It is assumed that the n-th word n optionally selected from the word set appears in a plural number Kn of the transition rules as the n-th word n of first through Kn-th occurrence. Each of the n-th word n of the first through the Kn-th occurrence defines a combination of the n-th word n and a state pair consisting of a start and an end state of the n-th word.

The connected word recognition method comprises a first step for memorizing reference pattern feature vectors representative of the first through the N-th words. The reference pattern feature vectors representative of the n-th words are consecutively numbered as first through J-th feature vectors $B_1^n$ to $B_J^n$ according to utterance of the n-th words. The method further comprises a second step for generating a basic timing signal successively specifying first through I-th periods assigned to the respective input pattern feature vectors, a word specifying signal specifying, while an i-th period is specified as each of the first through said I-th periods, the first through the N-th words, and a state specifying signal specifying, while the i-th period is specified, the state pairs of the first through the N-th words.

The method comprises a third step for selecting in response to the input sequence and the base timing, the word specifying, and the state specifying signals, while the n-th word n is specified in the i-th period, one of the n-th word of the first through the Kn-th occurrence as a selected n-th word. The selected n-th word will hereinafter be referred to as the n-th word n of selected occurrence.

The method comprises a fourth step for calculating in response to the input sequence and the base timing, the word specifying, and the state specifying signals, while the n-th word n is specified in the i-th period, a plurality of distances between the input pattern feature vector assigned to the i-th period and the first through the J-th feature vectors only for the n-th word n of the selected occurrence.

The method comprises a fifth step for calculating, while the n-th word n and each state pair of the n-th word n are specified in the i-th period, a recurrence value g(n, i, j) only for the n-th word n of the selected occurrence and the state pair for the n-th word n of the selected occurrence under a boundary condition iteratively in correspondence to the first through the J-th feature vectors by using the distances calculated for the n-th word of the selected occurrence before the i-th period, where n represents the n-th word, i represents the i-th period, and j represents a j-th feature vector representative of each of the first through the J-th feature vectors. The fifth step is for estimating the recurrence value for the n-th word of nonselected occurrence by using the recurrence value for the n-th word of the selected occurrence and the boundary conditions for the n-th word n of the selected and the nonselected occurrence. The n-th word n of the nonselected occurrence is a remaining one of the n-th word n of the first through the Kn-th occurrence that is not selected by the third step. The fifth step is for finding, while the i-th period is specified, a minimum T(q, i) of the recurrence values obtained for the words having state pairs including the end state q of the each state pair. The fifth step is for deciding that particular word and that particular start state of the particular word for which the minimum is found. The boundary conditions are given by T(p, i−1), where p represents the start state of the each state pair.

The system further comprises a sixth step for selecting in response to the basic timing, the word specifying, and the state specifying signals, while the i-th period is specified, a particular period from the first through the (i−1)-th periods with reference to the particular start state and the particular word and a seventh step for deciding the optimum concatenation by referring, after lapse of the I-th period, to the minima found in the first through the I-th periods, respectively, and to those particular words, those particular start states, and those particular start periods which are decided in the first through the I-th periods.

The third step is for selecting, as the n-th word n of selected occurrence, the above-mentioned one of the n-th word n of the first through the Kn-th occurrence minimum value of the boundary conditions T(p, i−1)'s.

In FIG. 3, the word n repeatedly appears in a plural number Kn of transition rules according to the grammar. In this illustrated example, the word n repeatedly appears in three transition rules as indicated by n(1), n(2), and n(3). That is, the number Kn is equal to 3. The transition rule for the word n(k) defines a combination of the word n(k) and a number pair consisting of a start state number pp(k, n) of the start state of the word n(k) and an end state number qq(k, n) of the end state of the word n(k), where k represents each of 1 to Kn. In the illustrated example, the start state number pp(1, n) and the end state number qq(1, n) are equal to 2 and 3, respectively. The start state number pp(2, n) and the end state number qq(2, n) are equal to 4 and 6, respectively. Likewise, the state number pp(3, n) and qq(3, n) are equal to 5 and 6, respectively.

Processing of the input string A is carried out in the connected word recognition method in the manner illustrated in FIG. 4. In FIG. 4, f(n, i) represents a minimum value of the minima or the boundary conditions T(p, i−1)'s for the words n(1), ..., n(Kn). According to this invention, a specific transition rule having the minimum value f(n, i) is selected among the transition rules for the words n(1), ..., n(Kn) at first and, then, word matching processing is carried out only for a specific word defined by the specific transition rule. In this event, the minimum value f(n, i) is stored in a word matching buffer (later illustrated). When the word matching processing comes to an end for the specific word, the recurrence value g(n, i, Jn) and the time instant l(n, i, Jn) of the start state of the specific word are obtained. For the words n(1), ..., n(Kn) except the specific word that are not subjected to the word matching processing, the recurrence values are estimated as:

$$g(n,i,Jn) \leftarrow f(n,l(n,i,Jn)) + g(pp(k,n),l(n,i,Jn)).$$

That is, a difference between g(pp(k, n), l(n, i, Jn)) and f(n, l(n, i, Jn)) is added to g(n, i, Jn).

Figure 5:
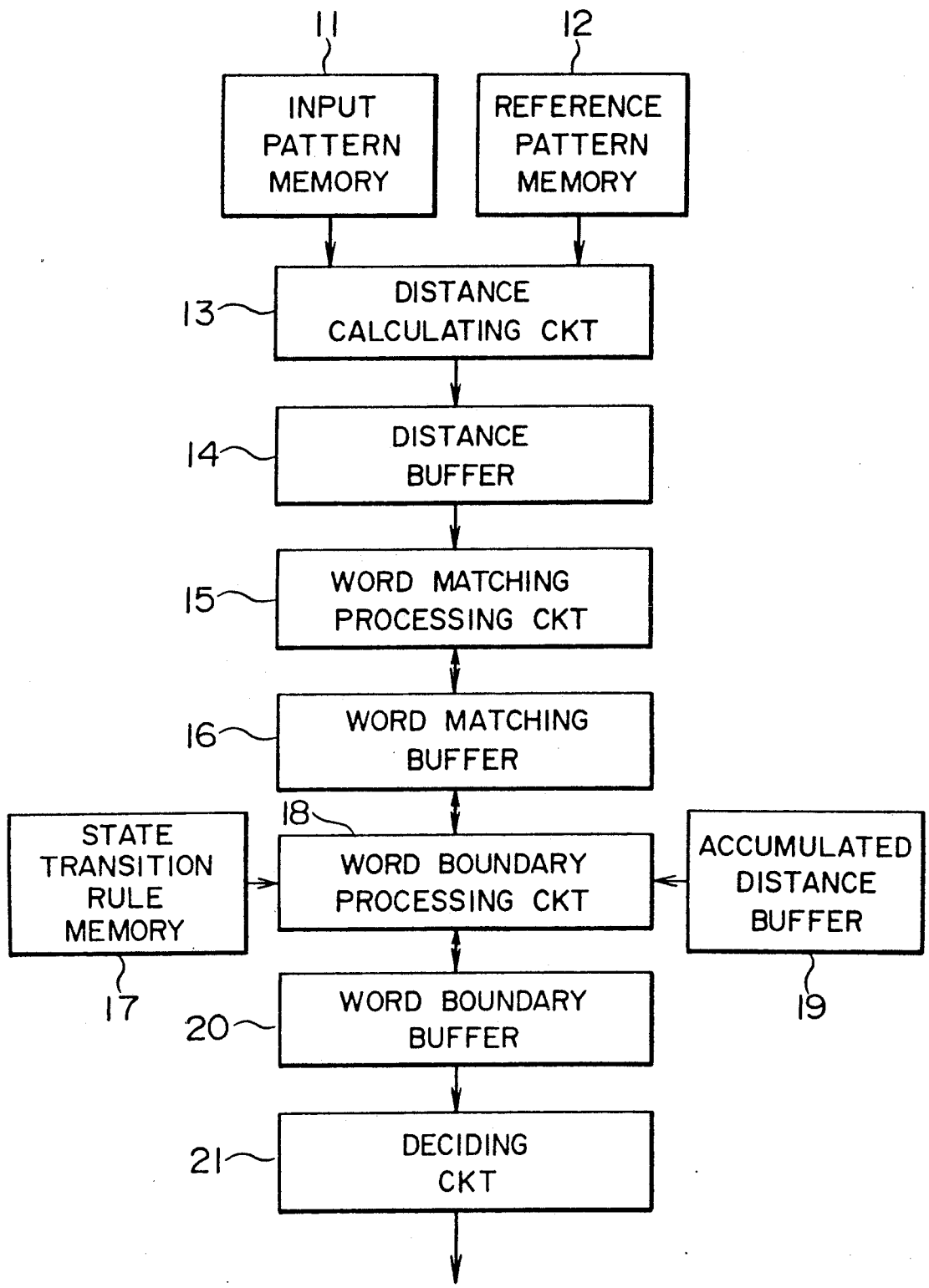
FIG. 5 is a block diagram of a connected word recognition system for use in carrying out the connected word recognition method according to the embodiment of this invention.

Turning to FIG. 5 with reference to FIG. 4 continued, description will proceed to a connected word recognition system for use in the connected word recognition method according to the embodiment of this invention. An input pattern memory 11 memorizes the input string A of words. A reference pattern memory 12 memorizes the reference pattern $B^n$.

A distance calculating circuit 13 reads the input string A and the reference pattern $B^n$ out of the input and the reference pattern memories 11 and 12 and calculates the distance d(n, i, j) between the feature vectors $a_i$ and $b_j^n$ to store the distance d(n, i, j) in a distance buffer 14.

A word matching buffer 16 is for memorizing the recurrence value (or an accumulated matching distance) g(n, i, J) obtained by word matching processing.

A word matching processing circuit 15 reads, during the i-th period, the distance d(n, i, j) and the accumulated matching distance g(n, i−1, J) out of the buffers 14 and 16 and carries out the word matching processing for each word n according to a group (b) of expressions of FIG. 4 to obtain the accumulated matching distance g(n, i, J). The accumulated matching distance g(n, i, J) is stored in the word matching buffer 16.

A word boundary processing circuit 18 reads the state transition rules and boundary conditions out of a state transition rule memory 17 and a word boundary buffer 20 and calculates initial values for the word matching processing according to a group (a) of expressions of FIG. 4 to store the initial values in an accumulated distance buffer 19 and the word matching buffer 16. The processing circuit 18 calculates, according to a group (c) of expression of FIG. 4 and by the use of a result of the word matching processing, an accumulated distance for the transition rules which is not subjected to the word matching processing. The processing circuit 18 thereby stores the accumulated distance in the word boundary buffer 10.

After lapse of the I-th period, a deciding circuit 21 reads a content of the word boundary buffer 20 and provides a string of words as a result of recognition by using a backtrack control procedure according to the expressions of FIG. 4.

What is claimed is:

1. A method of recognizing, as an optimum one of word concatenations, an input string of words represented by an input sequence of input pattern feature vectors, said input string of words being selected from a word set of first through N-th words and continuously uttered in compliance with a regular grammar, where N represents an integer greater than one, each concatenation being a string of words selected from said word set and concatenated in compliance with said grammar, said grammar specifying a set of transition rules of said first through said N-th words and a set of final states of said concatenations, an n-th word optionally selected from said first through said N-th words of said word set appearing in a plural number K of said transition rules as said n-th word of first through K-th occurrence, each of the n-th word of said first through said K-th occurrence defining a combination of said n-th word and a state pair consisting of a start and an end state of said n-th word, said method comprising the steps of:

memorizing reference pattern feature vectors representative of said first through said N-th words, the reference pattern feature vectors representative of said n-th word being feature vectors representative of said n-th word being consecutively numbered as first through J-th feature vectors according to utterance of said n-th word, where J represents an integer greater than one;

generating a basic timing signal successively specifying first through I-th periods assigned to the respective input pattern feature vectors, a word specifying signal specifying, while an i-th period is specified as each of said first through said I-th periods, said first through said N-th words, and a state specifying signal specifying, while said i-th period is specified, the state pairs of said first through said N-th words, where I represents an integer greater than one;

selecting in response to the input sequence and the base timing, the word specifying, and the state specifying signals, while said n-th word is specified in said i-th period, one of the n-th word of said first through said K-th occurrence as a selected n-th word;

calculating in response to the input sequence and the base timing, the word specifying, and the state specifying signals, while said n-th word is specified in said i-th period, a plurality of distances between the input pattern feature vector assigned to said i-th period and said first through said J-th feature vectors only for said selected n-th word;

calculating in response to the base timing, the word specifying, and the state specifying signals, while said n-th word and each state pair of said n-th word are specified in said i-th period, a recurrence value $g(n, i, j)$ only for said selected n-th word and the state pair for said selected n-th word under a boundary condition iteratively in correspondence to said first through said J-th feature vectors by using the distance calculated for said selected n-th word before said i-th period, where n represents said n-th word, i represents said i-th period, and j represents a j-th feature vector representative of each of the first through the J-th feature vectors, said last-mentioned calculating step estimating the recurrence value for said selected n-th word by using the recurrence value for said selected n-th word and the boundary conditions for said selected and said nonselected n-th word, said nonselected n-th word being a remaining one of the n-th word of said first through said K-th occurrence that is not selected by said selecting step, said last-mentioned calculating step finding, while said i-th period is specified, a minimum $T(q, i)$ of the recurrence values obtained for the words having state pairs including said end state q of said each state pair, said last-mentioned calculating step deciding that particular word and that particular start state of said particular word for which said minimum is found, said boundary conditions being given by $T(p, 1)$, where p represents the start state of said each state pair;

selecting in response to the basic timing, the word specifying, and the state specifying signals, while said i-th period is specified, a particular period from said first through said (i−1)-th periods with reference to said particular start state and said particular word; and deciding the optimum concatenation by referring, after lapse of said I-th period, to the minima found in said first through said I-th periods, respectively, and to those particular words, those particular start states, and those particular start periods which are decided in said first through said I-th periods;

said first-mentioned selecting step being for selecting, as said selected n-th word, said one of the n-th word of said first through said k-th occurrence that has a minimum value of the boundary conditions $T(p, i-1)$'s.

* * * * *